United States Patent [19]

Roling

[11] Patent Number: 5,512,243
[45] Date of Patent: Apr. 30, 1996

[54] CYCLOHEXANEDIONE OXYGEN SCAVENGERS

[75] Inventor: Paul V. Roling, Spring, Tex.

[73] Assignee: Betz Laboratories, Inc., Trevose, Pa.

[21] Appl. No.: 420,270

[22] Filed: Apr. 11, 1995

[51] Int. Cl.$^6$ ............................................. C02F 1/20
[52] U.S. Cl. .................... 422/14; 422/13; 210/750
[58] Field of Search ......................... 422/7, 14, 13; 568/376; 210/750

[56] References Cited

U.S. PATENT DOCUMENTS

| | | | |
|---|---|---|---|
| 3,770,377 | 11/1973 | Scott et al. | 422/12 |
| 3,876,371 | 4/1975 | Costain et al. | 422/12 |
| 3,965,050 | 6/1976 | Shimogawa et al. | 525/403 |
| 4,192,844 | 3/1980 | Trace et al. | 422/11 |
| 4,278,635 | 7/1981 | Kerst | 422/14 |
| 4,279,767 | 7/1981 | Muccitelli | 252/178 |
| 4,282,111 | 8/1981 | Ciuba | 252/178 |
| 4,289,645 | 9/1981 | Muccitelli | 252/178 |
| 4,487,708 | 12/1984 | Muccitelli | 252/178 |
| 4,541,932 | 9/1985 | Muccitelli | 210/750 |
| 4,549,968 | 10/1985 | Muccitelli | 210/750 |
| 4,569,783 | 2/1986 | Muccitelli | 252/188.28 |
| 4,657,740 | 4/1987 | Feldman | 422/13 |
| 4,693,866 | 9/1987 | Feldman | 422/13 |
| 4,728,497 | 3/1988 | Muccitelli | 422/16 |
| 5,147,604 | 9/1992 | Ciuba et al. | 422/13 |
| 5,256,311 | 10/1993 | Rossi et al. | 210/750 |

FOREIGN PATENT DOCUMENTS 2189781  11/1987  United Kingdom ............. 422/13

*Primary Examiner*—Robert J. Warden
*Assistant Examiner*—Theresa T. Snider
*Attorney, Agent, or Firm*—Alexander D. Ricci; Matthew W. Smith

[57] ABSTRACT

An oxygen scavenger for aqueous mediums is disclosed. The oxygen scavengers comprise cyclohexanediones which, when added to basic aqueous solutions, effectively scavenge oxygen from the aqueous solutions. The oxygen scavenger has particular utility as an oxygen scavenger from water in heating systems such as boilers and heat exchangers.

15 Claims, No Drawings

CYCLOHEXANEDIONE OXYGEN SCAVENGERS

FIELD OF THE INVENTION

The present invention relates to cyclohexanedione oxygen scavenger compositions and to methods of using the same.

BACKGROUND OF THE INVENTION

The presence of dissolved gases, even in small amounts, is undesirable in systems having aqueous solutions which contact metal surfaces. Metal surfaces in contact with oxygen-containing aqueous solutions can experience pitting. Pitting is highly concentrated corrosion affecting only a small area of the total metal surfaces. Pitting can be a serious problem causing metal failure even though only a small amount of metal is lost and the overall corrosion rate is relatively low.

The severity of attack by oxygen will depend on the concentration of dissolved oxygen in the aqueous solution, pH and temperature. As aqueous solution temperature increases, as for example in a water heating system, enough driving force is added to the corrosion reaction that small amounts of dissolved oxygen in the aqueous solution can cause serious problems. Oxygen pitting is considered to be a very serious problem in boiler systems, even where only trace amounts of oxygen are present.

Deaeration is a widely used method for removing oxygen from an oxygen-containing aqueous medium. It is particularly useful for treating boiler feedwater and can be either mechanical or chemical.

Vacuum deaeration has proven to be a useful mechanical deaeration method for treating water distributing systems. For example, boiler feedwater is commonly treated using pressure deaeration with steam as the purge gas. According to the pressure deaeration method for preparing boiler feedwater, the water is sprayed into a steam atmosphere and is heated to a temperature at which the solubility of oxygen in the water is low. About 95 to 99 percent of the oxygen in the feedwater is released to the steam and is purged from the system by venting.

Mechanical deaeration is considered an important first step in removing dissolved oxygen from water such as boiler feedwater. However, as already noted, as water temperature increases, even trace amounts of dissolved oxygen can cause serious problems. Accordingly, supplemental chemical deaeration is often required.

Oxygen pitting is also a problem in aqueous heat exchanger systems such as boiler feedwater heaters, economizers and superheaters.

Traditional chemical oxygen scavengers include sodium sulfite and hydrazine. However, sodium sulfite cannot be safely utilized in boiler systems operating at above 1000–1500 psi as corrosive hydrogen sulfide and sulfur dioxide can be formed at pressures above this range. Also, at these pressures, dissolved solids from the sulfite-oxygen reaction product can become a significant problem. Hydrazine is a toxic substance and is thought to be carcinogenic. Hence, its use is often undesirable.

It has been common in the past to combine an oxygen scavenger for treating boiler feedwater with a neutralizing amine for treating the steam condensate system of the boiler. Neutralizing amines are typically used in boiler systems to neutralize carbon dioxide in the condensed steam of the condensate system. This carbon dioxide is produced from the presence of carbonate or bicarbonate alkalinity in the boiler feedwater. Most deaerated boiler feedwater will contain alkalinity that undergoes decomposition at the higher temperature boiler operating conditions, releasing carbon dioxide with the steam. The most commonly used neutralizing amines for combining with oxygen scavenger have been morpholine and cyclohexylamine.

U.S. Pat. No. 4,192,844 discloses the use of methoxypropylamine neutralizing agent in combination with hydrazine to prevent corrosion in steam condensate systems.

Hydroquinone and hydroquinone mu-amine compositions have been used successfully as oxygen scavengers as described by Muccitelli in U.S. Pat. Nos. 4,279,767, 4,289,645, 4,487,708, 4,541,932, 4,549,968, 4,569,783, by Cuiba and Muccitelli in U.S. Pat. No. 5,147,604, by Cuiba in U.S. Pat. No. 4,282,111, and by Kerst in U.S. Pat. No. 4,278,635.

Rossi et al. in U.S. Pat. No. 5,256,311 discloses hydroxyalkylhydroxylamine oxygen scavengers for aqueous mediums.

Aminophenol compounds have been disclosed as oxygen scavengers in aqueous mediums in U.S. Pat. No. 4,728,497 to Muccitelli.

Feldman in U.S. Pat. Nos. 4,693,866 and 4,657,740 discloses the use of linear water soluble polyethyleneamines such as triethylenetetramine, tetraethylenepentamine, and pentaethylhexamines as oxygen scavengers when added to an aqueous medium. However, because of the variety of conditions in which oxygen induced corrosion of metal is a problem, a continual need exists for new oxygen scavengers.

Thus, it is an object of this invention to provide compositions and methods of using the compositions to scavenge oxygen from an aqueous solution.

SUMMARY OF THE INVENTION

To achieve the foregoing and other objects, the present invention provides compositions and methods of using the compositions to scavenge oxygen from an aqueous solution. The compositions are water soluble cyclohexanedione compositions which when added to an aqueous solution effectively reduce the oxygen content of the aqueous solution.

DETAILED DESCRIPTION OF THE INVENTION

The present invention provides water soluble oxygen scavengers which when added to an aqueous solution reduce the oxygen concentration in the aqueous solution.

The compositions are comprised of water soluble cyclohexanediones. The preferred cyclohexanedione is 1,4-cyclohexanedione. It is also believed that cyclohexanediones having the formula:

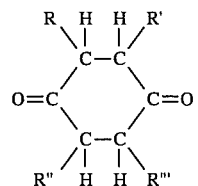

where R, R', R" and R'" may be hydrogens, or alkyl, cycloalkyl, aryl, alkaryl or aralkyl groups, would also effectively scavenge oxygen from an aqueous solution.

The oxygen scavengers are most effective in aqueous solutions having a pH greater than 7. If the aqueous solution is not basic prior to addition of the oxygen scavenger, a base can be added to the aqueous solution, prior to, simultaneously with or after addition of the oxygen scavenger to raise the pH of the aqueous solution to greater than 7. It is believed that bases such as oxides, hydroxides, carbonates, organic salts of alkali metals and alkaline earth metals, and amine compounds could be used in the practice of this invention. Preferred bases include neutralizing amines such as aminomethylpropanol, triethylenetetraamine, diisopropanolamine, sec-butylamine, monoisopropylamine, ethylenediamine, dimethylaminopropylamine, monoethanolamine, dimethyl(iso)propanolamine, methoxypropylamine, diethylaminoethanol, 2-amino-2-methyl-1-propanol and ammonia. The most preferred base is 3-methoxypropylamine (MOPA).

The amount of oxygen scavenger added to an aqueous solution to effectively reduce the oxygen concentration in the aqueous solution will depend on the amount of oxygen available in the aqueous solution, temperature, pH, the presence of other chemical treatments and other conditions. Thus, the effective amount of oxygen scavenger will be determined by the individual system to be treated. However, oxygen scavenger concentrations of from about 1 part per million (ppm) to about 10,000 ppm, preferably from about 1 ppm to 1000 ppm and most preferably from about 1 ppm to about 500 ppm are expected to effectively scavenge oxygen from aqueous solutions.

It is also believed that the cyclohexanedione oxygen scavengers of this invention will remove oxygen from aqueous solutions in combination with other known oxygen scavengers such as, but not limited to, hydroquinones, hydroxylamines, hydrazine, dihydroxyacetone, hydroquinone catalyzed furfural, ascorbic acid, isoascorbic acid, water soluble salts of ascorbic acid and isoascorbic acids, salicylaldehyde catalyzed by hydroquinone, aminophenols and polyethyleneamines.

The invention will now be described with reference to a specific example which is to be regarded solely as illustrative and not restrictive of the scope of the present invention.

EXAMPLE

To determine the efficacy of the instant invention, 250 mL of nano pure water, saturated with air was placed in a 250-mL, five necked flask equipped with a reflux condenser, a thermometer, inlet and outlet lines and a magnetic stirrer. Stirring was regulated to give the liquid a slight vortex. The water was pumped from the flask through tygon tubing into an Orbisphere oxygen meter, and back to the flask. The solvent was circulated for 30 minutes at 22° C. to establish a flat baseline on the oxygen meter, then one half gram of oxygen scavenger was added to the water and the oxygen level was monitored for 30 minutes. Then, 500 µL of 3-methoxypropylamine (MOPA) was added to the flask and the oxygen level was monitored for 30 minutes. The results are shown below in Table I below.

TABLE I

Percent Oxygen Scavenged in 30 minutes after addition of each treatment

| Oxygen Scavenger | Scavenger Alone | Scavenger +MOPA |
| --- | --- | --- |
| 1,2-cyclohexanedione | −1% | 11% |

TABLE I-continued

Percent Oxygen Scavenged in 30 minutes after addition of each treatment

| Oxygen Scavenger | Scavenger Alone | Scavenger +MOPA |
| --- | --- | --- |
| 1,3-cyclohexanedione | 4% | 6% |
| 1,4-cyclohexanedione | 0% | 100% in 8 minutes |
| 1,4-cyclohexanedione | 5% | 94%[a] |
| 1,4-cyclohexanedione | 1% | 99%[a] |
| 2,5-hexanedione | 7% | 0% |
| MOPA | — | 4% |

[a]Oxygen readings not checked during the 30 minute period.

$$\text{Percent } O_2 \text{ (scavenger alone)} = \frac{[O_2 \text{ reading before additive} - O_2 \text{ reading after additive}] * 100}{O_2 \text{ reading before additive}}$$

and where:

$$\text{Percent } O_2 \text{ (+MOPA)} = \frac{[O_2 \text{ reading after additive} - O_2 \text{ reading after MOPA}] * 100}{O_2 \text{ reading before additive}}$$

The example demonstrates that cyclohexanediones are exceptional oxygen scavengers in aqueous solutions under basic conditions.

Thus, the invention provides compositions and methods of using the compositions to scavenge oxygen from an aqueous solution. The compositions have particular utility for scavenging oxygen from water used in heating systems such as boilers and heat exchangers.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

I claim:

1. A method for reducing the amount of oxygen in an aqueous solution comprising adding to an oxygen containing aqueous solution having a pH greater than 7 an oxygen scavenging amount of a cyclohexanedione effective as an oxygen scavenger to reduce the amount of oxygen in said solution.

2. The method of claim 1 wherein said cyclohexanedione is 1,4-cyclohexanedione.

3. The method of claim 1 wherein said cyclohexanedione has the structure:

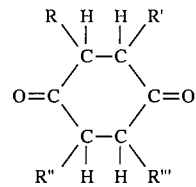

where R, R', R" and R'" are the same or are independently alkyl, cycloalkyl, aryl, alkaryl or aralkyl groups.

4. The method of claim 1 further comprising adding a base to said aqueous solution in an amount effective to produce said pH of greater than 7 in said aqueous solution.

5. The method of claim 4 wherein said base is selected from the group consisting of oxides, hydroxides, carbonates, organic salts of alkali metals, organic salts of alkaline earth metals, and amine compounds.

6. The method of claim 5 wherein said amine compound is selected from the group consisting of aminomethylpropanol, triethylenetetramine, diisopropanolamine, sec-butylamine, monoisopropylamine, ethylenediamine, dimethylaminopropylamine, monoethanolamine, dimethyl(iso)propanolamine, methoxypropylamine, diethylaminoethanol, 2-amino-2-methyl-1-propanol and ammonia.

7. The method of claim 1 wherein said aqueous solution is part of a water heating system.

8. The method of claim 1 wherein said oxygen scavenging amount is from about 1 ppm to about 10,000 ppm of said cyclohexanedione in said aqueous solution.

9. A method for reducing the amount of oxygen in an aqueous solution comprising adding to reduce the amount of oxygen in said solution from about 1 ppm to about 10,000 ppm of a composition comprising 1,4-cyclohexanedione to reduce the amount of oxygen in said solution and adding methoxypropylamine to said aqueous solution in an amount sufficient to raise the pH of said aqueous solution to greater than 7.

10. A method for reducing the amount of oxygen in an aqueous solution comprising adding to an oxygen containing aqueous solution having a pH greater than 7 an oxygen scavenging amount of an oxygen scavenging composition, said composition comprising:

a) a cyclohexanedione effective as an oxygen scavenger; and b) an oxygen scavenger selected from the group consisting of hydroquinones, hydroxylamine, hydrazine, dihydroxyacetone, hydroquinone catalyzed furfural, ascorbic acid, isoascorbic acid, water soluble salt forms of ascorbic and isoascorbic acid, salicyclaldehyde catalyzed by hydroquinone, aminophenols and polyethyleneamines to reduce the amount of oxygen in said solution.

11. The method of claim 10 wherein said composition further comprises a base selected from the group consisting of oxides, hydroxides, carbonates, organic salts of alkali metals, alkaline earth metals and amine compounds.

12. The method of claim 11 wherein said amine compound is selected from the group consisting of aminomethylpropanol, triethylenetetramine, diisopropanolamine, sec-butylamine, monoisopropylamine, ethylenediamine, dimethylaminopropylamine, monoethanolamine, dimethyl(iso)propanolamine, methoxypropylamine, diethylaminoethanol, 2-amino-2-methyl-1-propanol and ammonia.

13. The method of claim 12 wherein said cyclohexanedione is 1,4-cyclohexanedione.

14. The method of claim 13 wherein said cyclohexanedione has the structure:

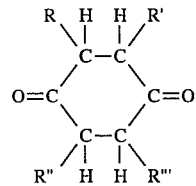

where R, R', R" and R'" are the same or are independently alkyl, cycloalkyl, aryl, alkaryl or aralkyl groups.

15. The method of claim 10 wherein said aqueous solution is boiler or heat exchanger water.

* * * * *